United States Patent [19]

Rais et al.

[11] Patent Number: 5,510,091
[45] Date of Patent: Apr. 23, 1996

[54] METHOD OF SEPARATING TRANSPLUTONIUM ELEMENTS FROM LANTHANIDES IN ACIDIC SOLUTIONS BY SOLVENT EXTRACTION

[75] Inventors: Jiri Rais; Shoichi Tachimori, both of Ibaraki, Japan

[73] Assignee: Japan Atomic Energy Research Institute, Tokyo, Japan

[21] Appl. No.: 318,262

[22] Filed: Oct. 5, 1994

[30] Foreign Application Priority Data

Oct. 5, 1993 [JP] Japan ................... 5-249368

[51] Int. Cl.$^6$ ................................. B01D 11/00
[52] U.S. Cl. ................................. 423/9
[58] Field of Search ................................. 423/9

[56] References Cited

U.S. PATENT DOCUMENTS

| | | | |
|---|---|---|---|
| 4,496,523 | 1/1985 | Bonnin et al. | 423/9 |
| 4,867,951 | 9/1989 | Smith et al. | 423/9 |
| 4,876,232 | 10/1989 | Barkatt | 502/417 |

FOREIGN PATENT DOCUMENTS 1355535  6/1974  United Kingdom .

OTHER PUBLICATIONS

K. L. Nash, A Review of the Basic Chemistry and Recent Developments in Trivalent f–Elements Separations, *Solvent Extraction and Ion Exchange*, 11(4), 729 (1993).

C. Musikas et al., Properties and Uses of Nitrogen and Sulfur Donors Ligands in Actinide Separations in Actinide Separation, *Actinide Separations*, edited by J. D. Navratil and W. W. Schulz, ACS Symposium Series 117, American Chemical Society, Washington, D.C. (1980).

*Primary Examiner*—Ngoclan Mai
*Attorney, Agent, or Firm*—Banner & Allegretti, Ltd.

[57]    ABSTRACT

The improved method of separating transplutonium elements from lanthanides comprises the steps of adding an organic solvent containing an N-heterocyclic compound and a hydrophobic anion to an acidic aqueous solution containing both a lanthanide and a transplutonium element (TPE) and then extracting the transplutonium element into the organic phase. The method is capable of selective extraction of TPE without producing liquid wastes, is adapted to the continuous treatment process and yet can be implemented using inexpensive chemicals.

4 Claims, No Drawings

METHOD OF SEPARATING TRANSPLUTONIUM ELEMENTS FROM LANTHANIDES IN ACIDIC SOLUTIONS BY SOLVENT EXTRACTION

BACKGROUND OF THE INVENTION

1. Field of the Invention

This invention relates to a method of treatment or disposal of high level wastes that result from the reprocessing of spent fuels in the nuclear fuel cycle. More particularly, the invention relates to a method of separating transplutonium elements such as Am and Cm from lanthanides in acidic solutions by solvent extraction.

2. Prior Art

High level wastes that result from the reprocessing of spent fuels in the nuclear fuel cycle contain many kinds of radioactive nuclides. Among them, transplutonium elements such as Am and Cm are very long-lived alpha-emitting nuclides and need be disposed of in a separate form from other nuclides. To this end, efforts are being undertaken to search for safe and positive methods of disposal such as nuclear transmutation and extraterrestrial ejection. To implement these methods, the step of separating small amounts of transplutonium elements from lanthanides that behave in chemically similar ways and that are contained in large quantities in high level wastes is necessary.

In known of separating transplutonium elements (hereunder sometimes referred to as "TPE") from lanthanides (hereunder sometimes referred to as "RE"), either the neutralization treatment of solutions is necessary or highly concentrated salts or harmful complex ions such as $SCN^-$ and $N_3^-$ are utilized. Another known method is the TALSPEAK process which uses an extraction system consisting of di-2-ethylhexylphosphoric acid and diethylene triamine pentaacetic acid (DTPA). In this process, the pH of the solution to be treated must be adjusted to approximately 3.5 before the extracting operation is started. What is more, RE rather than TPE is extracted by this method. Since high level wastes (hereunder sometimes referred to as "HLW") typically contain RE in amounts at least 10 times as much as TPE, the method which involves the extraction of RE is by no means a preferred approach. A further problem with this method is that the post treatment of the remaining aqueous TPE solution is cumbersome.

Among the techniques that have been proposed in recent years, the use of sulfur (S) or nitrogen (N) atom containing heterocyclic compounds or crown ethers, which are the "soft" complexing agents introduced by Musikas in France, is held promising and the following data have been reported in laboratories: separation factor $(D_{Am}/D_{Eu})= \beta=16.5-18.5$ in a system consisting of 0.0037–0.0067M (initial concentration) $HNO_{3/0.25}$ M ortho-phenanthroline+ 0.25M nonanoic acid/nitrobenzene; distribution ratios, $D_{Am}=1380$ and $D_{Eu}= 891$ (i.e., $\beta=1.55$) in a system consisting of 0.1M $HNO_3$/0.5 M ortho-phenanthroline/0.1M dibutylphosphoric acid (HDBP)/nitrobenzene, and $D_{Am}=0.331$ and $D_{Eu}=0.0676$ ($\beta=4.90$) in a system consisting of 0.1 M $HNO_3$/0.5 M ortho-phenanthroline/0.001M HDBP/nitrobenzene; and $\beta=$ ca. 10 in a system consisting of tris[2, 4,6-(2-pyridyl)] 1,3,5-triazine (also referred to as TPTZ) and dinonyl naphthalenesulfonic acid (also referred to as HDNNS). In the last case, the distribution ratio of TPTZ ($D_{TPTZ}$) was about 10 and its loss to the aqueous phase was substantial; in addition, HDNNS, being surface active, was very inefficient in phase separation. However, the greatest advantage of the last system is its ability to achieve separation even from a 0.125 M $HNO_3$ solution.

A separating system consisting of a crown compound and hexachloro-cobalt-dicarbollide (also referred to as CCD) was developed in Russia. In a specific system composed of 18-crown-6 and CCD, a separation factor ($\beta$) of about 3.2 was achieved for Am/Eu. If the initial concentration of Eu is 0.5 M, $\beta$ is about 6.0 and the intended separation can be accomplished with a system consisting of 0.5 M $HNO_3$/0.2 M 18-crown-6+0.3 M CCD/nitrobenzene. No case has been reported of the loss of 18-crown-6 to the aqueous phase in this extraction system. The system was implemented on an actual scale in Russia but the achieved $\beta$ value of 3–4 is not satisfactorily large.

In the methods by which the RE present in large quantities in HLW is extracted into the organic phase, the trace TPE of interest is left intact in the aqueous phase together with other impurities and, hence, an independent step is required to separate the TPE by extraction. A further problem is that if a pre-neutralization treatment is necessary, a large amount of alkali is added to the solution to be treated and this causes an undesirable effect in that liquid wastes containing large amounts of salts will result.

In the extraction systems that use the so far reported "soft" complexing agents or crown compounds, TPE is extracted selectively but the separation factor ($\beta$) of RE and TPE is not adequately high. Further, TPTZ which is highly soluble in the aqueous phase experiences a substantial loss and, hence, is not suitable for use in the continuous treatment process. What is more, crown compounds and TPTZ are very expensive chemicals.

SUMMARY OF THE INVENTION

The present invention has been accomplished under these circumstances and has as an object providing a method for separation of transplutonium elements from lanthanides that is capable of selective extraction of TPE without producing liquid wastes, that is adapted to the continuous treatment process, and which yet can be implemented using inexpensive chemicals.

The present inventors conducted intensive studies with a view to attaining this object and found that using an extraction solvent containing an N-heterocyclic compound in combination with a highly hydrophobic anion, they could selectively extract TPE with satisfactorily high separation efficiency even when TPE was contained in acidic solutions. The present invention has been accomplished on the basis of this finding.

According to the invention, there is provided a method of separating transplutonium elements from lanthanides, which comprises the steps of adding an organic solvent containing an N-heterocyclic compound and a hydrophobic anion to an acidic aqueous solution containing both a lanthanide and a transplutonium element and then extracting the transplutonium element into the organic phase.

In the method of the invention, an N-heterocyclic compound and a hydrophobic anion are dissolved in an organic solvent, which then is brought into contact with an acidic aqueous solution containing both a lanthanide and a transplutonium element, and the mixture is agitated. As a result, only the transplutonium element is extracted into the organic phase, leaving most of the lanthanide in the aqueous phase.

DETAILED DESCRIPTION OF THE INVENTION

The term "lanthanides" as used herein covers the 14 elements ranging from cerium (Ce) with atomic number 58 to lutetium (Lu) with atomic number 71. Two representative lanthanides that are contained in HLW are europium (Eu) and neodymium (Nd).

The term "transplutonium elements" as used herein means the elements with atomic numbers greater than that of plutonium (94). Two representative transplutonium elements that are contained in HLW are americium (Am) and curium (Cm).

The acidic aqueous solution to be treated by the method of the invention may contain one or more lanthanides. Similarly, the acidic aqueous solution may contain one or more transplutonium elements.

The term "acidic aqueous solution" to be used herein refers to aqueous solutions of acids that are capable of dissolving both lanthanides and transplutonium elements. The acids may be of any kinds including inorganic an organic acids. One of the major features of the invention is that the intended solvent extraction can be achieved directly from the acidic aqueous solution without performing any neutralization step. From the viewpoint of solvent extraction, it is preferred to use inorganic, rather than organic, acids, and the use of nitric acid is particularly preferred. The concentration of acids is not limited to any particular value but it is preferred to use solutions of ca. 0.01–ca. 4M with the range of ca. 0.01–ca. 3M being particularly preferred.

The preferred concentration of the transplutonium elements to be contained in the acid aqueous solution depends on the concentration of hydrophobic anions but it generally ranges from trace quantities to about $10^{-2}$ M. The concentration of lanthanides is not limited to any particular values and they may be contained in the acid aqueous solution in substantially large amounts compared to the transplutonium elements.

The term "N-heterocyclic compound" to be used herein covers compounds having a ring that consists of at least one nitrogen atom and carbon atoms, as well as derivatives of such compounds. Exemplary N-heterocyclic compounds that can be used include: pyrrole, imidazole, pyrazole, 3-pyrroline, pyrrolidine, pyridine, pyrimidine, purine, quinoline, isoquinoline, carbazole, indole, piperidine, ortho-phenanthroline and para-phenanthroline, as well as alkyl-substituted derivatives of these compounds. Particularly preferred N-heterocyclic compounds are selected from the group consisting of pyridine, piperidine, ortho-phenanthroline and para-phenanthroline. The use of ortho-phenanthroline is particularly preferred.

The term "hydrophobic anions" as used herein means highly hydrophobic ions with negative charges. To have such hydrophobic anions dissolved in organic solvents, metal salts, such as sodium and potassium salts, of the hydrophobic anions or free acids containing them are used. In the invention, hexachloro-cobalt-dicarbollide (CCD) and tetraphenylborane, as well as their derivatives are preferably used as hydrophobic anions. The use of CCD is particularly preferred.

The organic solvent to be used in the invention may be of any kind that is capable of dissolving the N-heterocyclic compound and hydrophobic anions and that is suitable for solvent extraction. Preferred examples are nitrobenzene, carbon tetrachloride, diethylbenzene and isopropylbenzene.

The concentration of the N-heterocyclic compound to be contained in the organic solvent ranges preferably from about 0.05M to about 0.25M, whereas the concentration of the hydrophobic anion in the organic solvent ranges preferably from about 0.01M to about 0.2M.

The volume ratio between the aqueous (A) and organic (0) phases is not limited to any particular value in the solvent extraction of transplutonium elements and the preferred range of O/A is from about 10 to about 0.1. After mixing the aqueous and organic phases, the mixture is stirred or shaken for several minutes, say, 5 min, followed by standing to separate the two phases.

To utilize the method of the invention in the treatment of high level wastes that result from the nuclear fuel cycle, trivalent RE and TPE are subjected to the sequence of co-extraction and back extraction by a process such as the transuranic extraction (TRUEX) process and, thereafter, the method of the invention is employed to perform a continuous extraction process with a countercurrent multi-stage extractor.

According to the invention, values greater than 20 are attained as separation factor ($\beta$) and quantitative separation between TPE and RE can be accomplished with those values. As another advantage, the method of the invention is free not only from the difficulty in phase separation which is encountered by HDNNS but also from the loss to the aqueous phase which occurs in TPTZ. As a result, the continuous extraction process using a countercurrent multi-stage extractor enables the selective separation and recovery of TPE in high purity and yield.

The following examples are provided for the purpose of further illustrating the present invention but are in no way to be taken as limiting.

EXAMPLE 1

$^{241}$Am and $^{152}$Eu were dissolved in 1M nitric acid and then diluted with water to prepare 100 ml of a 0.1M nitric acid solution. The concentration of Am in the nitric acid solution was on a tracer level and the concentration of Eu was $10^{-3}$M.

In a separate step, ortho-phenanthroline and a sodium salt of CCD were dissolved in nitrobenzene to prepare 100 ml of a nitrobenzene solution, which contained 0.25M of ortho-phenanthroline and 0.1M of sodium salt of CCD.

The two solutions were put into a separating funnel, shaken for 5 min and left to stand until the mixture separated into the aqueous and organic phases. The two phases were measured for the radioactivity of gamma emissions so as to determine the distribution ratio of Am and Eu; the results were $D_{Am}$=106.8 and $D_{Eu}$=2.71. Hence, the separation factor ($\beta$) that could be achieved in Example 1 was 39.4.

EXAMPLE 2

The procedure of Example 1 was repeated except that the concentration of a sodium salt of CCD in the organic phase was reduced to 0.05M. The results were $D_{Am}$=2.47 and $D_{Eu}$=0.0953. Hence, the separation factor ($\beta$) that could be achieved in Example 2 was 25.9.

EXAMPLE 3

The procedure of Example 2 was repeated except that Eu was replaced by $1\times10^{-4}$ M of Ce (III). The result was $D_{Ce}$=0.0748. Hence, the separation factor ($\beta$) that could be achieved in Example 3 was 33.0.

EXAMPLE 4

The procedure of Example 2 was repeated except that Eu was replaced by $1\times10^{-4}$ M of Gd (III). The result was $D_{Gd}$=0.0768. Hence, the separation factor ($\beta$) that could be achieved in Example 4 was 32.2.

EXAMPLE 5

The procedure of Example 1 was repeated except that the sodium salt of CCD in the organic phase was replaced by a hydrogen form of CCD and that the concentration of ortho-phenanthroline was reduced to 0.0625M. The results were $D_{Am}=1.70$ and $E_{Eu}=1.25$. Hence, the separation factor ($\beta$) that could be achieved in Example 5 was 1.36.

What is claimed is:

1. A method of separating transplutonium elements from lanthanides, which comprises the steps of adding an organic solvent containing an N-heterocyclic compound and a hydrophobic anion to an acidic aqueous solution containing both a lanthanide and a transplutonium element and then extracting the transplutonium element into the organic phase.

2. A method according to claim 1 wherein the N-heterocyclic compound is selected from the group consisting of pyridine, piperidine, ortho-phenanthroline and para-phenanthroline.

3. A method according to claim 1 wherein the hydrophobic anion is hexachloro-cobalt-dicarbollide or tetraphenylborane.

4. A method according to claim 1 wherein the acidic aqueous solution is an aqueous solution of 0.01–3M nitric acid.

* * * * *